Oct. 6, 1970 F. BUCKLEY 3,532,909
TRANSISTOR LOGIC SCHEME WITH CURRENT LOGIC LEVELS
ADAPTED FOR MONOLITHIC FABRICATION
Filed Jan. 17, 1968 2 Sheets-Sheet 1

INVENTOR
FREDERICK BUCKLEY
BY John C Black
ATTORNEY

Oct. 6, 1970 F. BUCKLEY 3,532,909
TRANSISTOR LOGIC SCHEME WITH CURRENT LOGIC LEVELS
ADAPTED FOR MONOLITHIC FABRICATION
Filed Jan. 17, 1968 2 Sheets-Sheet 2

United States Patent Office 3,532,909 Patented Oct. 6, 1970

3,532,909

TRANSISTOR LOGIC SCHEME WITH CURRENT LOGIC LEVELS ADAPTED FOR MONOLITHIC FABRICATION

Frederick Buckley, Vestal, N.Y., assignor to International Business Machines Corporation, Armonk, N.Y., a corporation of New York

Filed Jan. 17, 1968, Ser. No. 698,566
Int. Cl. H03k *19/08*
U.S. Cl. 307—213 7 Claims

ABSTRACT OF THE DISCLOSURE

A logic block is described which can be fabricated entirely in transistors and whose logic states are two ranges of current levels. All of the transistors are operated in their linear regions and a single reference current together with transistors having their base-collector electrodes short-circuited set the various operating current levels throughout the logic block.

The logic block has one or more current inputs to a single input node and one or more output currents. Each input current to the node is at or below a predetermined lower level or, alternatively, at or above a predetermined upper level. The current transfer characteristic of the circut is such that 1 to *n* input currents each at or below the lower level produce an output current at or below that lower level, and one or more of the *n* input currents at or above the predetermined upper level produce an output current at or above that upper level. The circuit performs a logical "OR" function between current levels at or above said upper level (taken as a logical "1" state) and current levels at or below the lower level (taken as a logical "0" state).

BACKGROUND OF THE INVENTION

(1) Field of the invention

An improved logic block is disclosed which is used in an environment wherein the logical signals are in the form of current levels rather than voltage levels. The improved logic block can be fabricated solely from transistors of both conductivity types or of one conductivity type. The only potential use for a resistor is in the bias circuit which establishes, by means of transistors, the various operating current levels throughout the logic block. One or more logic blocks can be fabricated monolithically on a single semiconductor chip and can share the same bias circuit.

(2) Description of the prior art

The improved logic block of the present application makes use of the teaching of copending U.S. patent application Ser. No. 513,395 of R. Ordower, filed Dec. 13, 1965 now U.S. Pat. 3,392,342 for a "Transistor Amplifier with Gain Stability"; and said copending application is hereby incorporated herein by reference. Said copending application teaches and claims the use of one or more diodes in the form of transistors having their base-collector electrodes short-circuited and connected across the base-emitter electrodes of one or more transistor amplifiers to control the output current of the amplifier as a function of input current into the diodes. The diodes and the transistor amplifier have base-emitter voltage-current characterisics matched as perfectly as practical to provide a ratio of total collector current to total diode current which is an inverse function of the number of diodes and a direct function of the number of transistor amplifiers. For example, one diode and one amplifier provides a current ratio of one; two diodes and one amplifier provides a ratio of one-half; one diode and two amplifiers provide a ratio of two, and so on.

The logic block of the present application makes use of this basic principle to control operating currents through various portions of the logic block.

SUMMARY OF THE INVENTION

It is a primary object of the present invention to provide an improved logic block which responds to input currents at one or the other of two predetermined ranges of current levels to produce output currents at one or the other of the predetermined ranges of current levels.

It is another object of the present invention to provide an improved logic block of the type described immediately above which can be fabricated monolithically by known techniques solely in transistors.

It is a further object of the present invention to provide logic blocks of the type described above which are compatible with both logic levels and power supplies of existing circuit families, which are operable with relatively unfiltered power supplies, which can be arranged to minimize transient current drawn from power supplies, in which the transistors are operated neither at saturation nor at cut-off for maximum speed and which, because of its being operated with essential current rather than voltage levels, is relatively uneffected by the capacitive environment normally experienced in monolithic-digital logic circuits and can provide high speed at relatively low dissipation per block.

The transfer relation of the improved logic block is such that one to *n* input currents at or below a lower level produce an output current at or below that lower level, and one or more input currents at or above a predetermined upper level produce an output current at or above that upper level.

The current transfer function described above is achieved in a preferred embodiment by providing a pair of transistors having their emitter electrodes connected in common to a first current source. The base electrode of each of the transistors is connected to a respective plurality of series-connected diodes or, alternatively, a plurality of transistors with their base-collector electrodes short-circuited. The voltage-current characteristics of the devices in each plurality must be substantially matched with those in the other plurality. A second current source, the level of which is a predetermined fraction of the level of the first current source, is connected to one series-connected plurality of diodes in order to establish a predetermined voltage level at the base electrode of one of the transistors. The junction between the base electrode of the other transistor and its series-connected diodes forms the input node of the logic block and has coupled thereto the input currents.

The respective complementary output currents in the collector electrodes of the pair of transistors are related to each other as a function of the current levels applied to their respective pluralities of diodes to a power equal to the number of diodes in each plurality.

The first current source includes a first transistor. A second transistor having its base-collector electrodes short-circuited is connected across its base-emitter electrodes of the first transistor causing the first transistor to supply current to the pair of transistors equal to a reference current flowing in the second transistor.

The second current source includes a third transistor. A plurality *m* of transistors having their base-collector electrodes short-circuited and receiving said reference current are connected across the base-emitter electrodes of the third transistor causing it to supply to its series of diodes $1/m$ times said reference current.

Instead of output logic signals being derived directly from the collector electrodes of the pair of transistors, the collectors can be returned to their voltage supply by way of transistors having the base-collector electrodes short-circuited. Each of the latter transistors is then connected across the base-emitter electrodes of one or more common emitter transistor amplifiers to produce one or more output currents, each equal in value to the current flowing in its respective latter transistor.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1A:
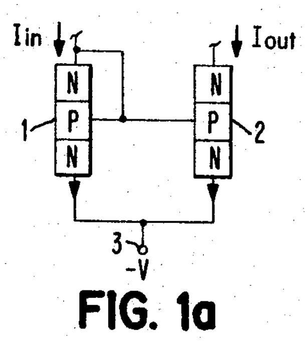
FIGS. 1*a* and 1*b* illustrate transistor current relationships utilized in the improved logic block.
Figure 1B:
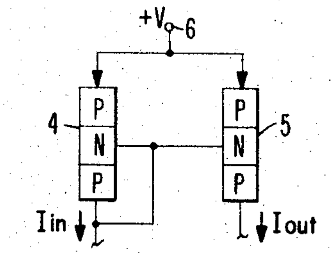

FIGS. 1*a* and 1*b* illustrate briefly certain of the teachings of the above-mentioned Ordower application which are utilized in the improved logic circuit of the present application.

n FIG. 1*a* a pair of NPN transistors are shown which have substantially matched base-emitter voltage-current characteristics. The transistor 1 has its base and collector electrodes short-circuited and connected to the base electrode of the transistor 2. The emitter electrodes of the two transistors are connected together and to the negative supply terminal 3.

As described more fully in the Ordower application, the current I*in* flows through the transistor 1, the base current of the transistor 2 being so low in relation to the collector current of transistor 1 as to be neglected. The current flowing through the transistor 1 produces a voltage at the base of the transistor 2 which causes a collector current I*out* which is substantially equal to the current I*in*.

As more fully taught in the Ordower application, if an additional transistor similar to 1 is connected across the base-emitter electrodes of the transistor 2, the current I*in* will divide equally causing the current I*out* to be one-half of the current I*in*. Alternatively, if an additional transistor such as 2 is conected in parallel with the transistor 2, then each of the transistors will have a collector current I*out* equal to the current I*in*, therefore producing two units of output current for one unit of input current. By selecting different numbers of transistors 1 and/or 2, various current ratios can be obtained.

FIG. 1*b* illustrates the same principle as applied to PNP transistors 4 and 5. The transistor 4 has its base-emitter electrodes short-circuited and connected to the base electrode of the transistor 5. The emitter electrodes are connected together and to a positive supply terminal 6. With the base-emitter voltage-current characteristics of the transistors 4 and 5 being substantially matched, the current I*in* which flows into the transistor 4 will equal the collector current I*out* coming from the collector electrode of the transistor 5.

Figure 2:
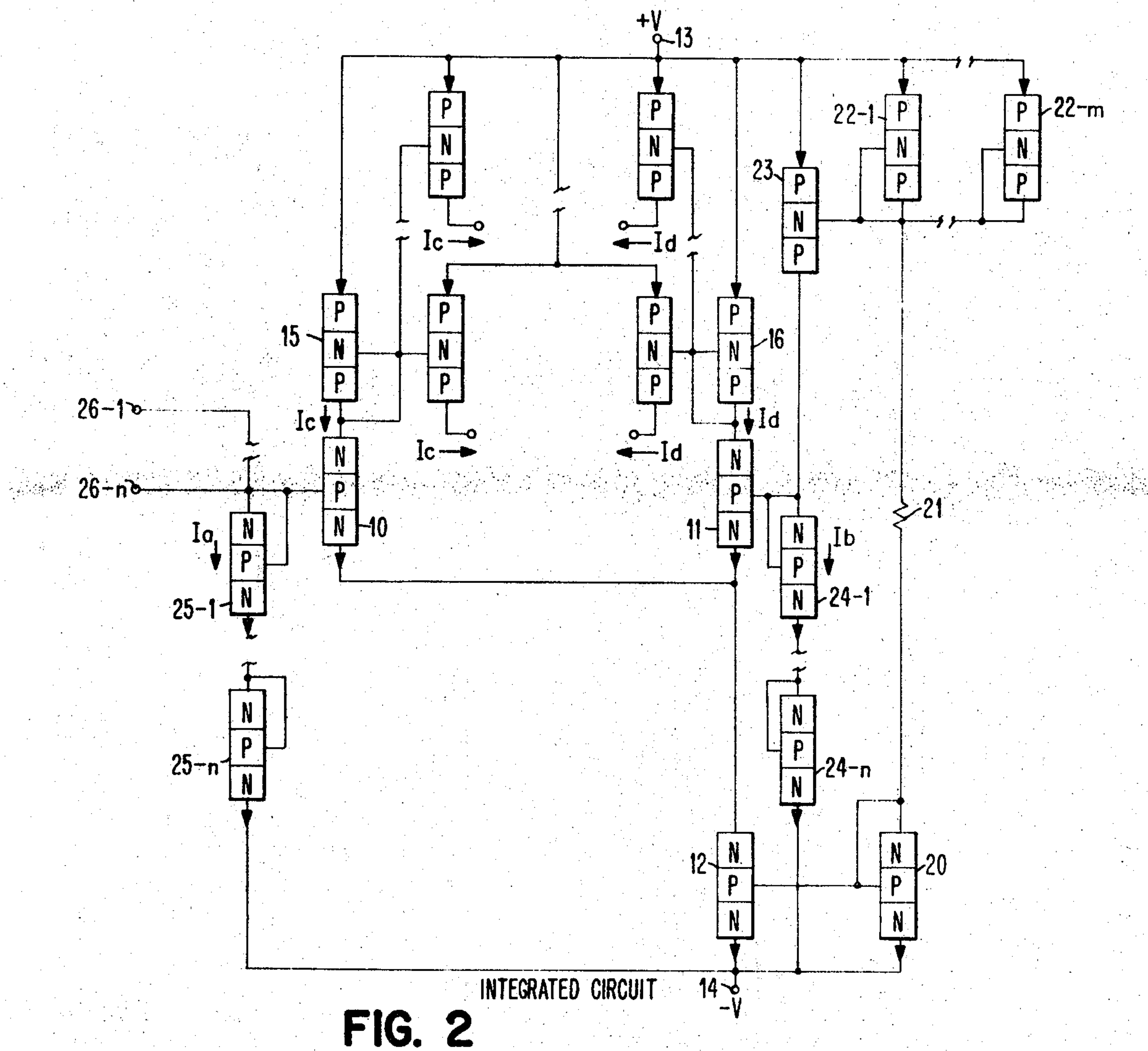
FIG. 2 is a schematic diagram of a preferred embodiment of the improved logic block.

This method of producing output currents in transistors, which are equal to a fraction or a multiple of the input current to the transistor, will be utilized in the preferred embodiment of FIG. 2 for controlling operating current levels.

The current logic block of FIG. 2 comprises a pair of NPN transistors 10 and 11 which have their emitter electrodes connected together and to a current source in the form of an NPN transistor 12. The collector electrodes of the transistors 10 and 11 are connected to a positive supply terminal 13 by way of PNP transistors 15 and 16 having their base-collector electrodes short-circuited.

The level of current supplied to the transistors 10 and 11 by the transistor 12 is determined by a voltage divider comprising an NPN transistor 20 having its base-collector electrodes short-circuited, a resistor 21 and parallel-connected PNP transistors 22–1 to **22–*m*** having their base-collector electrodes short-circuited.

If we assume that the resistor 21 supplies one unit of current to the transistor 20, then it will deliver $1/m$ units of current to each of the parallel-connected transistors 22–1 to **22–*m*. The transistor 20 has base-emitter voltage-current characteristics which substantially match those of the transistor 12. As a result, since the transistor 20 is connected across the base-emitter electrodes of the transistor 12, the transistor 12 will deliver one unit of current to the emitter electrodes of the transistors 10 and 11; i.e. the same unit of current delivered to the transistor 20 by the resistor 21**.

The transistors 22–1 to **22–*m* are connected across the base-emitter electrodes of a PNP transistor 23. The emitter electrode of the transistor 23 is connected to the positive supply terminal 13 and its collector electrode is connected to the base electrode of the transistor 11**.

The base-emitter voltage-current characteristics of the transistors 22–1 to **22–*m* substantially match those of the transistor 23. The collector current of the transistor 23 is therefore equal to the current in each of the transistors such as 22–1, i.e. $1/m$ units of current. This collector current from the transistor 23 is applied to a plurality of transistors 24–1 to 24–*n*, each of which is an NPN transistor having its base-collector electrodes short-circuited. The transistor 24–*n* has its emitter electrode connected to the negative supply terminal 14. The transistors 24–1 to 24–*n* fix the voltage at the base electrode of the transistor 11 at a value which is a function of the current delivered by the transistor 23**.

The base electrode of the transistor 10 is connected to a second plurality of series-connected NPN transistors 25–1 to **25–*n* which are equal in number to the transistors 24–1 to 24–*n*. The base-collector electrodes of each of the transistors 25–1 to 25–*n* are short-circuited. The plurality of transistors 25–1 to 25–*n* has a voltage-current characteristic which matches that of the plurality of transistors 24–1 to 24–*n* so that when a predetermined level of current equal to that delivered by the transistor 23 is also passed through the transistors 25–1 to 25–*n*, the latter transistors will produce a voltage at the base electrode of the transistor 10 which is equal to that produced at the base electrode of the transistor 11 by the transistors 24–1 to 24–*n***.

Input current signals from sources (not shown) are applied to the base electrode of the transistor 10 by way of input terminals 26–1 to **26–*n*. The base current of the transistor 10 is so small as to be neglected, whereby substantially all of the current received at terminals 26–1 to 26–*n* flows through the transistors 25–1 to 25–*n***.

If we let I*a* equal the value of the current flowing through the transistors 25–1 to **25–*n*** and I*b* equal the current flowing through the transistors 24–1 to **24–*n***, then the collector currents I*c* and I*d* of the transistors 10 and 11 are related as follows:

$$\frac{Ic}{Id}=\left[\frac{Ia}{Ib}\right]^{n} \quad (1)$$

where:

*n* is the number of transistors in each series, such as 24–1 to **24–*n* or 25–1 to 25–*n***. Since the collector currents I*c* and I*d* summed together equal one unit of current (which is delivered by the transistor 12 to the emitters) and since I*b* equals $1/m$ (*m* being the number of transistors in the plurality 22–1 to **22–*m***), the above equation can be rewritten as follows:

$$Ic=\frac{Ia^{n}}{Ia^{n}+[1/m]^{n}} \quad (2)$$

Figure 4:
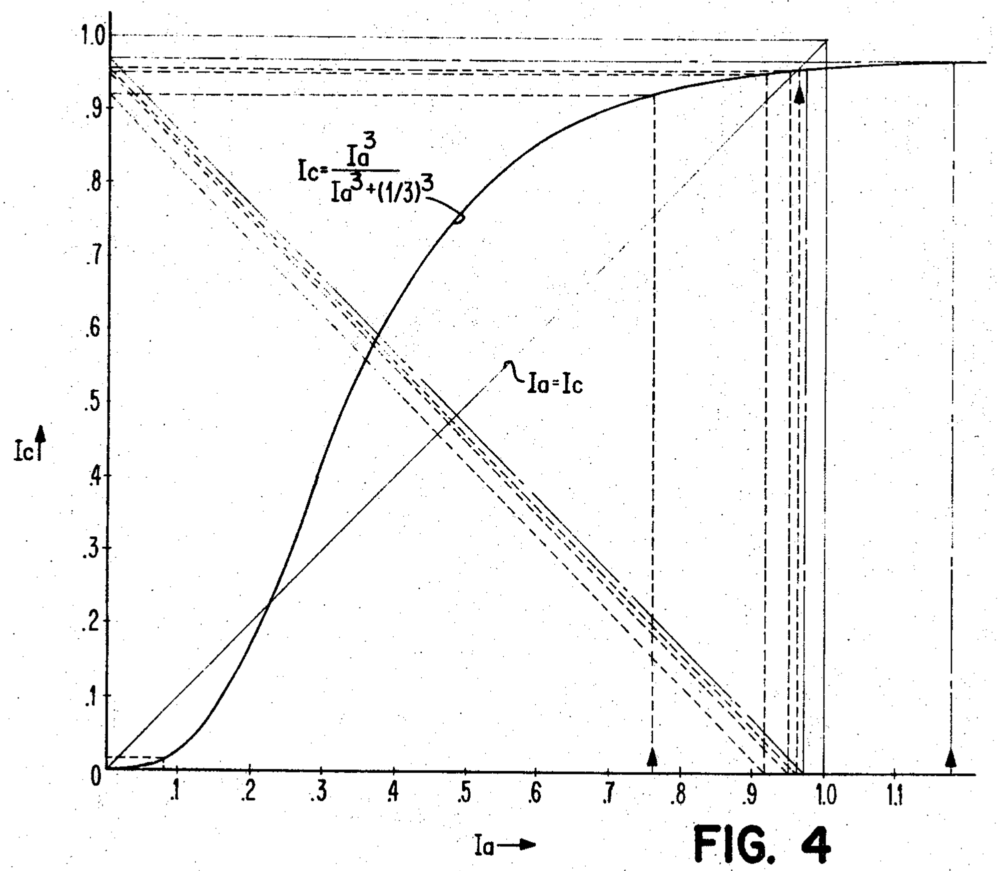
FIG. 4 illustrates the operating characteristics of the improved logic block.

The current transfer characteristic of Equation 2 is plotted in FIG. 4 for $n$ equals three and $m$ equals three. An input current I$a$ of approximately .96 unit produces an equal output current I$c$. The minimum logical "1" signal is set equal to .96 unit of current and the maximum logical "0" signal is the complement, i.e. .04 unit of current, to provide an OR function. Input currents are received at each of the terminals 26–1 to 26–$n$ at or below .04 unit of current (logical "0") or alternatively at or above .96 units of current (logical "1"). As seen in the graph of FIG. 4, three input currents each equal to .04 unit of current, i.e. a total input current I$a$ of .12 unit, produce an output current I$c$ of approximately .04 unit of current. A fan-in of three inputs to the logic block is possible. Current inputs I$a$ of .08 unit (two logic zeros) or of .04 unit (one logic zero) give an output current I$c$ of less than .04 unit of current (logic zero).

An input current I$a$ equal to .96 unit (logical "1") produces an output current I$c$ of .96 units (logical "1"). Two or more logical "1" signals will produce an output current I$c$ of approximately .99 unit of current (logical "1").

The current I$d$ is the complement of the current I$c$, that is, one unit of current minus the level of the current I$c$. If, as described above, the output current I$c$ reflects an OR function, the output current I$d$ reflects OR INVERT function.

It can be seen from the graph and the above description that with a logical "0" signal of .04 unit of current or lower, a total fan-in of three current signals is possible in the circuit of FIG. 2. A greater number of input signal currents would produce an output current larger than the maximum value of .04 unit of current allowed for the logical "0" condition.

A few of the interesting characteristics of the current transfer relation illustrated in FIG. 4 should be observed, reference being directed to the broken lines. For example, if the input current I$a$ is approximately .76 unit of current, the output current I$c$ would be close to the desired value of .96 unit, i.e. approximately .92 unit of current. If this output current I$c$ of .92 unit were then applied as a single input current I$a$ to a second stage, it would in turn produce an output I$c$ extremely close to the desired minimum output level of .96 unit of current. It will be appreciated, therefore, that in a cascaded string of logic blocks, each having a single input, there is regeneration of the signal levels.

Similarly, large currents I$a$ (e.g. 2, 3 units) tend to produce smaller currents I$c$ (e.g. about .99 unit) close to the desired minimum logical "1" level of .96 unit.

Increased fan-in can, therefore, be achieved by taking outputs not from the stage performing the logic function but from a following single input stage which regenerates the signals to the desired logic levels.

One preferred method of deriving output signals equal to I$c$ and I$d$ is illustrated in FIG. 2. The collector electrodes of the transistors 10 and 11 are connected to their positive supply terminal 13 by way of PNP transistors 15 and 16 respectively. Each of the transistors 15 and 16 has its base-collector electrodes short-circuited. The transistor 15 is connected across the base-emitter electrodes of a plurality of PNP transistors 30–1 to 30–$n$. Each of the transistors 30–1 to 30–$n$ will have a collector current which is substantially equal to the current flowing through the transistor 15. Since the current I$c$ flows through the transistor 15, a substantially equal current level also flows in the collector outputs of the transistors 30–1 to 30–$n$.

The transistor 16 is connected across the base-emitter electrodes of a plurality of PNP transistors 31–1 to 31–$n$. The collector current of each of the transistors 31–1 to 31–$n$ will be substantially equal to the current flowing through the transistor 16. Since the current I$d$ flows through the transistor 16, a substantially equal current also flows in the collector circuits of each of the transistors 31–1 to 31–$n$.

Each pair of transistors such as 30–1 to 31–1 provides complemented outputs from the logic block of FIG. 2. The maximum number of outputs which can be derived from a logic block depends upon the beta of the transistors. It is necessary that the total base currents of all of the transistors 30–1 to 30–$n$ when summed together must be substantially less than the current flowing through the transistor 15. Otherwise, the substantially equal current relationships of the transistors 15 and 30–1 to 30–$n$ are lost.

Figure 3:
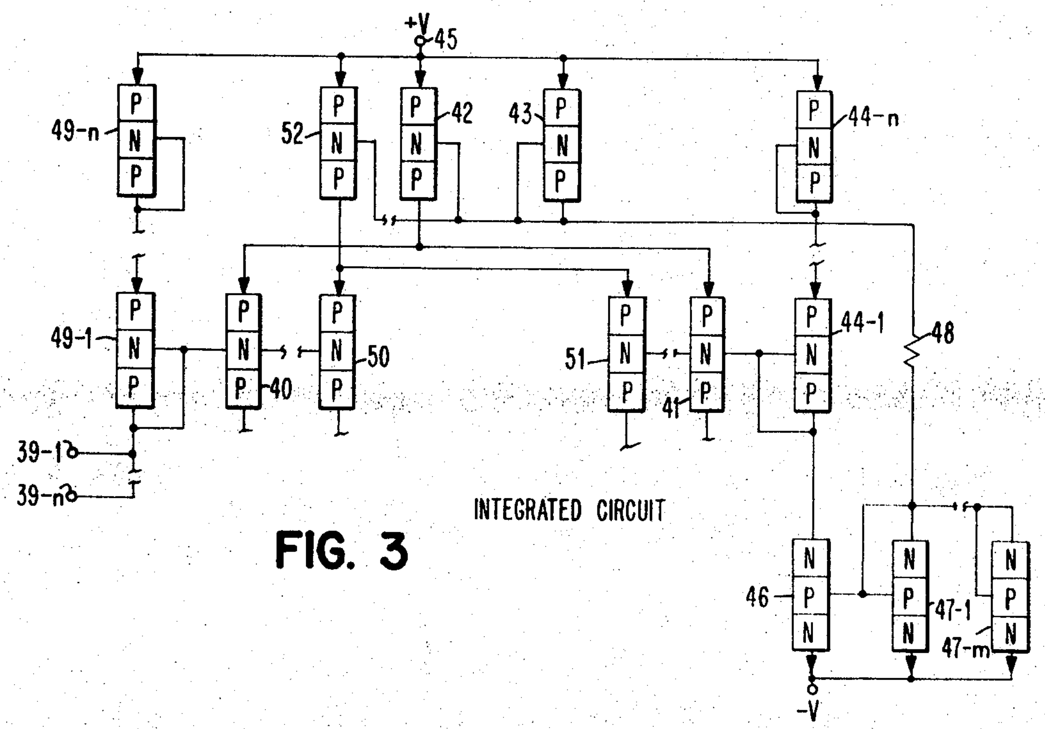
FIG. 3 is a fragmentary schematic diagram of another embodiment of the improved logic block.

FIG. 3 illustrates a second embodiment of the improved logic block. The logic block of FIG. 3 comprises a first pair of PNP transistors 40 and 41 which have their emitter electrodes connected in common to a current supply in the form of a PNP transistor 42. A PNP transistor 43 having its base-collector electrodes short-circuited is connected across the base-emitter electrodes of the transistor 42 to produce in the collector electrode of the transistor 42 a current which is substantially equal to the current flowing through the transistor 43.

A first plurality of PNP transistors 44–1 to 44–$n$ is connected between the base electrode of the transistor 41 and a positive supply terminal 45. Current supplied by an NPN transistor 46 to the transistors 44–1 to 44–$n$ establishes a predetermined voltage at the base electrode of the transistor 41. The level of current delivered by the transistor 46 to the transistors 44–1 to 44–$n$ is determined by the level of current flowing through a plurality of parallel-connected NPN transistors 47–1 to 47–$m$.

Each of the transistors 44–1 to 44–$n$ has its base-collector electrodes short-circuited and connected to a resistor 48, the other terminal of which is connected to the transistor 43. The resistor 48 and the associated power supply delivers one unit of current to the transistor 43 and $1/m$ units of current to each of the transistors 47–1 to 47–$m$. Thus the transistor 43 causes the transistor 42 to deliver one unit of current to the emitter electrodes of the transistors 40 and 41; and transistors 47–1 to 47–$m$ cause the transistor 46 to deliver $1/m$ units of current to the transistors 44–1 to 44–$n$.

The base electrode of the transistor 40 is connected to a plurality of series-connected PNP transistors 49–1 to 49–$n$ equal in number to the transistors 44–1 to 44–$n$. The base-emitter voltage-current characteristics of the series of transistors 49–1 to 49–$n$ substantially match those of the series of transistors 44–1 to 44–$n$. Input current signals are received at terminals 39–1 to 39–$n$.

The circuit of FIG. 3, so far as it has been described, is similar to the basic logic block of FIG. 2 except that the conductivity types of the transistors have been reversed and the power supplies have been suitably connected. If we ignore certain portions of the bias circuit which establish the operating current levels, that is, transistor 46 and the transistors 47–1 to 47–$m$ and the resistor 48, it will be seen that the logic block of FIG. 3 is comprised solely of PNP transistors.

It may be desirable to fabricate such circuits having transistors with conductivities of one type only on a single semiconductor chip. In this instance the resistor and transistors in the bias circuit would be on another chip, or for that matter, discrete components; and the bias circuit may be shared by several logic blocks if desired.

In such an event, the succeeding logic blocks in a series would have to be of opposite conductivity types; that is, the first and all odd-numbered logic blocks could be fabricated on a single semiconductor chip of PNP transistors and the second and all even-numbered logic blocks would be fabricated on a semiconductor chip with NPN transistors.

With this type of technology; that is, wherein the logic blocks are fabricated with transistors having conductivities of one type only, it will be appreciated that transistors such as 30–1 to 30–$n$ and 31–1 to 31–$n$ of FIG. 2 cannot be utilized for plural outputs. In order to have more than one set of complemented outputs in this type of technology, additional transistors of the same conductivity type such as 50 and 51 of FIG. 3 can be utilized.

The transistors 50 and 51 have their emitter electrodes connected to a current source in the form of a PNP transistor 52. The transistor 43 is connected across the base-emitter electrodes of the transistor 52 to determine the current level therein. Thus the transistor 52 will deliver one unit of current to the emitter electrodes of the transistors 50 and 51. The base electrode of the transistor 50 is connected to the series-connected transistors 49–1 to **49–*n* and the base electrode of the transistor 51 is connected to the series-connected transistors 44–1 to 44–*n***.

Since the transistors 50 and 51 have the same level of current supplied to their emitters as do the transistors 40 and 41, and since they have the same biasing transistors connected to their base electrodes as do the transistors 40 and 41, it is apparent that the output currents of the transistors 50 and 51 are equal to those of the transistors 40 and 41 respectively.

The number of transistors such as 40 and 50 which can be connected in this manner to produce output currents is limited by the beta of the transistors. In order to maintain the desired current relationships between the transistors connected as diodes and the transistors such as 40, 41, 50 and 51 it is necessary for the total base currents to be very small in relation to their associated transistor-diode currents.

It will be appreciated that if the desired logic blocks are to be generally of the type shown in FIG. 3, but with additional outputs provided as shown in FIG. 2 rather than by means of transistors 50 and 51, this can be achieved by connecting the collector electrodes of the transistors 40 and 41 to NPN transistors having their base-collector electrodes short-circuited and by connecting the latter transistors across the base-emitters of a plurality of respective transistor outputs in a manner similar to that shown in FIG. 2.

It will be noted that the various transistors are operated in their linear regions to achieve the desired current relationships.

Throughout the application the statement has been made with respect to various transistors that their base-collector electrodes are short-circuited. By this statement, it is meant that the connection between the base and collector electrodes is preferably as low as possible an impedance path. Typically, the lowest impedance path is made by the conventional metallic conductive patterns formed on the semiconductor chip. It will be appreciated, however, that other techniques can be utilized, for example, resistive diffusions or combinations of resistive underpass diffusions and metallic connections so long as a very low impedance path is assured.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A signal translating circuit comprising:
first and second transistors of one conductivity type having base, emitter and collector electrodes,
the emitter electrodes being adapted for connection with a first current source,
first and second substantially matched equal pluralities of series-connected semiconductor devices connected respectively to the base electrodes of the first and second transistors,
the first plurality of semiconductor devices adapted to receive current at a level which is a predetermined fraction of the level of the first current source for establishing a reference voltage at the base electrode of the first transistor,
the base electrode of said second transistor and the second plurality of semiconductor devices adapted for connection to an input current means to produce for currents in the collector electrodes substantially in accordance with the current transfer characteristic $$\frac{Ic}{Id}=\left[\frac{Ia}{Ib}\right]^n$$

where:
$Ic$ is the collector current of the second transistor,
$Id$ is the collector current of the first transistor,
$Ia$ is the input current,
$Ib$ is the current received by the first plurality of semiconductor devices, and
$n$ is the number of semiconductor devices in each plurality.

2. A signal translating circuit comprising:
first and second transistors of one conductivity type having base, emitter and collector electrodes,
the emitter electrodes being adapted for connection with a first current source to receive one unit of current,
first and second substantially matched equal pluralities of series-connected semiconductor devices connected respectively to the base electrodes of the first and second transistors,
the first plurality of semiconductor devices adapted to receive $(1/m)$ units of current for establishing a reference voltage at the base electrode of the first transistor,
the base electrode of said second transistor and the second plurality of semiconductor devices adapted for connection to an input current means to produce currents in the collector electrode of the second transistor substantially in accordance with the current transfer characteristic $$Ic=\frac{Ia^n}{Ia^n+[1/m]^n}$$

where:
$Ic$ is the collector current of the second transistor,
$Ia$ is the input current, and
$n$ is the number of semiconductor devices in each plurality.

3. A transistor logic circuit for use with current logic levels comprising:
first and second transistors of one conductivity type having base, emitter and collector electrodes,
a first current source connected to said emitter electrodes,
first and second substantially matched equal pluralities of series-connected diodes connected respectively to the base electrodes of the first and second transistors,
means including a second current source having a level which is a predetermined fraction of the level of the first current source connected to the first plurality of series-connected diodes to establish a reference voltage at the base electrode of the first transistor,
the base electrode of said second transistor and the second plurality of diodes adapted for connection to a predetermined number of input current logic signals each of which is at or below a predetermined lower level or alternatively at or above a predetermined upper level for producing in the collector electrode of the second transistor an output current logic signal which is at or below said predetermined lower level when all input current logic signals are at or below said predetermined lower level or alternatively at or above said predetermined upper level when at least one of the input current logic signals is at or above said predetermined upper level.

4. A transistor logic circuit for use with current logic levels comprising:
first and second transistors of one conductivity type having base, emitter and collector electrodes, a first current source connected to said emitter electrodes, first and second equal pluralities of series-connected transistors of said one conductivity type having their base-collector electrodes substantially short-circuited and having substantially matched base-emitter voltage-current characteristics, each plurality connected to a respective base electrode of the first and second transistors, means including a second current source having a level which is a predetermined fraction of the level of the first current source connected to the first plurality of series-connected transistors to establish a reference voltage at the base electrode of the first transistor, the base electrode of said second transistor and the second plurality of transistors adapted for connection to a predetermined number of input current logic signals each of which is at or below a predetermined lower level or alternatively at or above a predetermined upper level for producing in the collector electrode of the second transistor an output current logic signal which is at or below said predetermined lower level when all input current logic signals are at or below said predetermined lover level or which is alternatively at or above said predetermined level when at least one of the input current logic signals is at or above said predetermined upper level.

5. The logic circuit of claim 4 wherein the first current source includes first and second additional transistors of said one conductivity type having substantially matched base-emitter voltage-current characteristics and having their emitter electrodes connected together, the collector electrode of the second additional transistor being connected to the emitter electrodes of the first and second transistors, the first additional transistor having its base-collector electrodes short-circuited and connected to the base electrode of the second additional transistor to produce substantially equal collector currents, wherein the second current source includes a third additional transistor and a plurality *m* of fourth additional transistors of the opposite conductivity type having substantially matched base-emitter voltage-current characteristics and having their emitter electrodes connected together, the collector electrode of the third additional transistor being connected to the first plurality of series-connected transistors, the fourth additional transistors having their base-collector electrodes short-circuited and connected to the base electrode of the third additional transistor to produce substantially equal collector currents in the third additional transistor and each fourth additional transistor, and wherein means supplies one unit of current to the second additional transistor and $1/m$ units of current to each of the fourth additional transistors.

6. The logic circuit of claim 4 further comprising first and second additional transistors of the opposite conductivity type each having its base-collector electrodes short-circuited and connected to receive the collector current of the first and second transistors respectively, and a predetermined number of third and fourth additional transistors of said opposite conductivity type having base-emitter voltage-current characteristics substantially matching those of the first and second additional transistors respectively and having their base-emitter junctions in parallel with the first and second additional transistors respectively to produce collector currents each substantially equal to those of the first and second transistors respectively.

7. The logic circuit of claim 4 further comprising first and second additional transistors of said one conductivity type having emitter electrodes and having base electrodes connected respectively to the first and second plurality of series-connected transistors, and an additionl current source supplying current equal to that of the first current source to the emitter electrodes of the first and second additional transistors.

References Cited

UNITED STATES PATENTS

| | | | |
|---|---|---|---|
| 3,320,439 | 5/1967 | Widlar | 307—303 |
| 3,392,342 | 7/1968 | Ordower | 330—22 |

DONALD D. FORRER, Primary Examiner

H. A. DIXON, Assistant Examiner

U.S. Cl. X.R.

307—218, 270, 303; 330—40, 69